Figure 1:
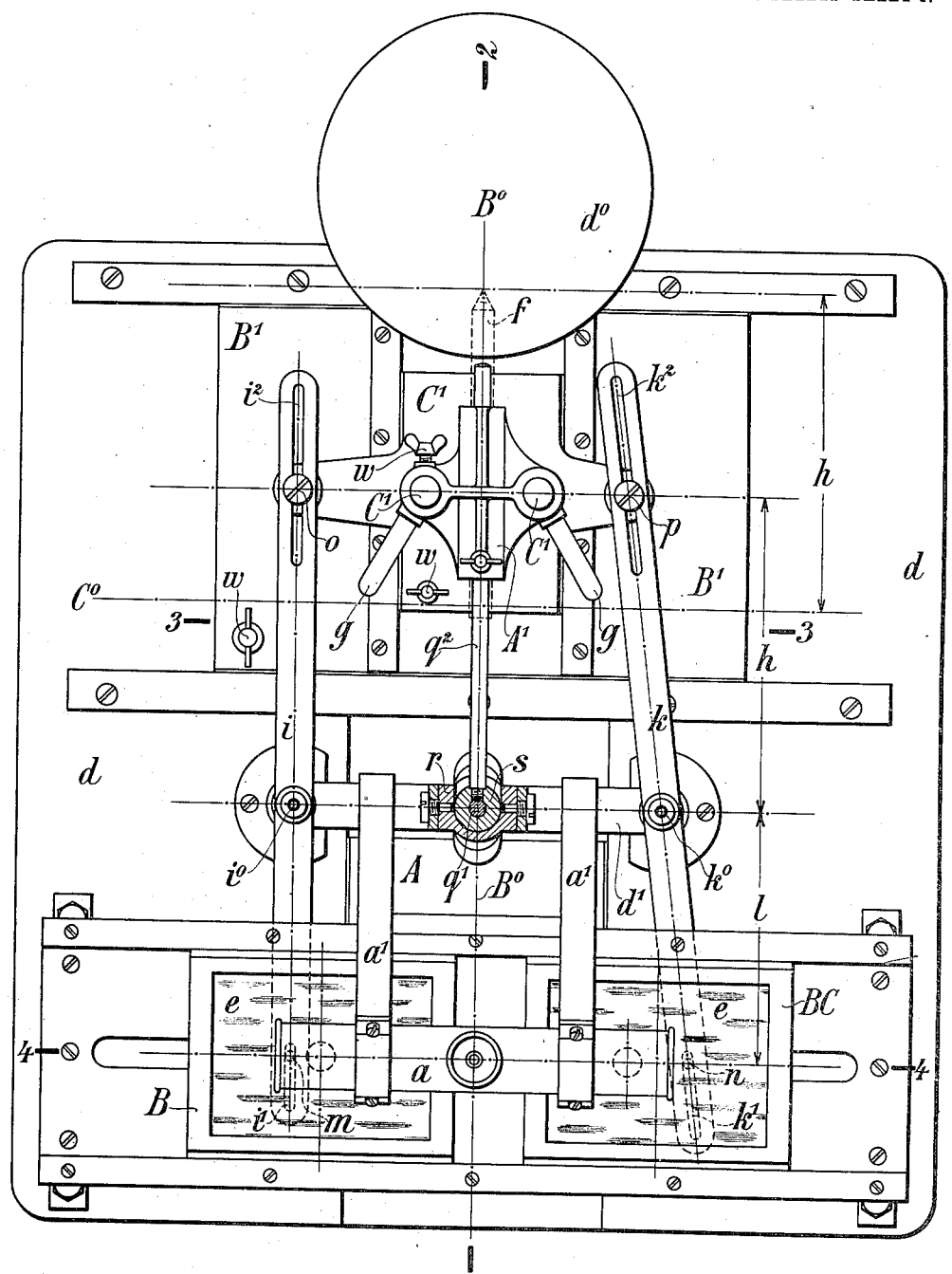

E. VON OREL.
STEREO APPARATUS FOR PLASTIC REPRODUCTION.
APPLICATION FILED DEC. 13, 1911.

1,090,493.

Patented Mar. 17, 1914.
3 SHEETS—SHEET 1.

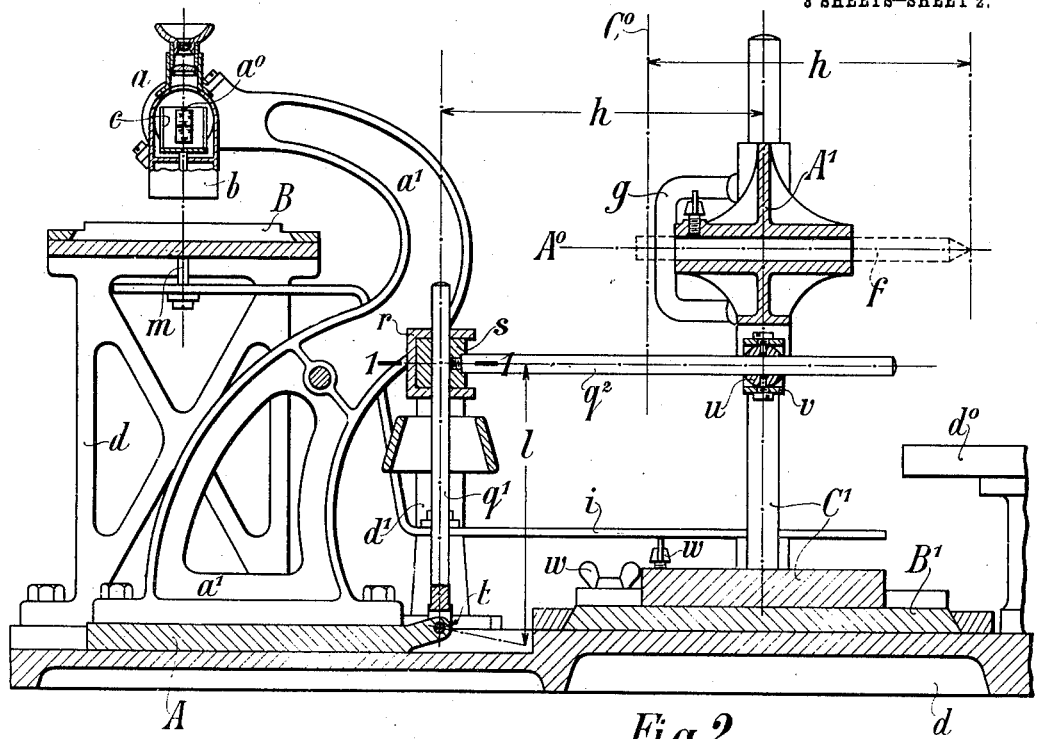
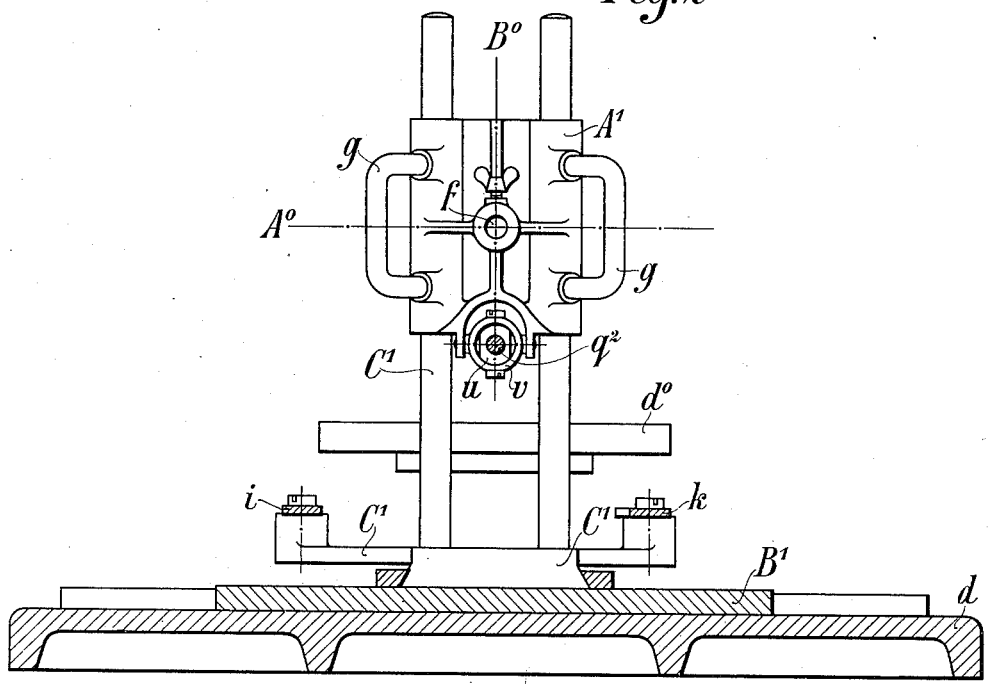

UNITED STATES PATENT OFFICE.

EDUARD VON OREL, OF VIENNA, AUSTRIA-HUNGARY, ASSIGNOR TO THE FIRM OF CARL ZEISS, OF JENA, GERMANY.

STEREO APPARATUS FOR PLASTIC REPRODUCTION.

1,090,493.  Specification of Letters Patent.  Patented Mar. 17, 1914.

Application filed December 13 1911. Serial No. 665,573.

*To all whom it may concern:*

Be it known that I, EDUARD VON OREL, a citizen of Austria, residing at Vienna, Austria-Hungary, have invented a new and useful Stereo Apparatus for Plastic Reproduction, of which the following is a specification.

The object of the present invention is to enable a single person to copy from a stereoscopic pair of photograms of an object of three dimensions not only without calculation, viz. principally mechanically, but also in a sense automatically the surface of this object, as far as the same is imaged in both photograms, or any linear or punctual elements of this surface with the aid of a pointed member, this member either being a movable tool adapted to work out the copy directly from the material to be formed, or serving only as a gage, as in a machine for locating points in sculpture. The new apparatus which solves this problem, is a combination of a stereo-comparator, the copying device proper and a system of actuating devices, which latter may be very simple, but may also be comparatively complicated and is at any rate so arranged that the operator can manipulate it, while looking into the stereo-comparator. The above mentioned three principal parts are positively interconnected in such a manner that the position of the pointed tool belonging to the copying device proper with regard to the copy to be made always corresponds to that point of the object to be copied that is indicated in the stereo-comparator.

A stereo-comparator is usually fitted with a double microscope, which is binocular or monocular and contains a mark in each of the two image-fields or in the common image-field respectively. An ordinary stereo-comparator comprises further three slides, a height-slide, a breadth-slide and a depth-slide. The height-slide causes a relative displacement of the microscope and the photograms in the height-direction of the latter, the breadth-slide just such a displacement in the breadth-direction of the photograms, while the depth-slide alters the distance apart of the photograms. A triple slide system can also serve as copying device. Let that slide, which is slidable in the height-direction of the copy-carrier, be termed the copier height-slide. The two other slides are then the copier breadth-slide and the copier depth-slide. The sequence of the three slides is optional. The pointed tool or the copy-carrier is to be mounted on the top one, according as the copy-carrier or the tool is the fixed part.

For copying a surface by copying lines comprising all points of the said surface, which have the same position as to height or breadth or depth, the copier height-slide or the copier breadth-slide or the copier depth-slide respectively is set in a fixed position corresponding to the chosen height, breadth or depth on the slide next below it, in a given case on the guide of the bottom slide.

The three comparator slides on the one hand, and the three copier slides on the other hand, are to be coupled as follows: When the two photograms are displaced by the comparator breadth-slide, the comparator depth-slide must be coupled with the copier breadth-slide and the copier depth-slide, and in such a manner that the distance between the two photograms is maintained, when only the copier breadth-slide, but not the copier depth-slide as well, changes its locus. The coupling between the comparator depth-slide and the copier depth-slide is intended to give to the tool-point a distance from the zero-depth-plane (the copy, so to speak, of the vertical plane laid through the base-line determined by the objectives used in taking the photograms), which is the product derived from the length of this base-line, the focal length of the said objectives, the scale of reduction of the copy and the reciprocal of the surplus, which the distance apart of the photograms, caused by the comparator depth-slide, shows as compared with the minimum distance belonging to infinitely distant object-points (which indeed is never realized).

The comparator height-slide and comparator breadth-slide are to be coupled, the former with the copier height-slide and the copier depth-slide, the second with the copier breadth-slide and the copier depth-slide, in such a manner that thereby the tool-point is given a (negative or positive) distance from the zero-height-plane, or the zero-breadth-plane respectively, which distance is the product derived from the (negative or positive) displacement of the comparator height-slide or comparator breadth-slide respectively, from the zero-position, the reciprocal of the focal length of the objectives used in taking the photograms and the distance of the tool-point from the zero-depth-plane.

Figure 4:
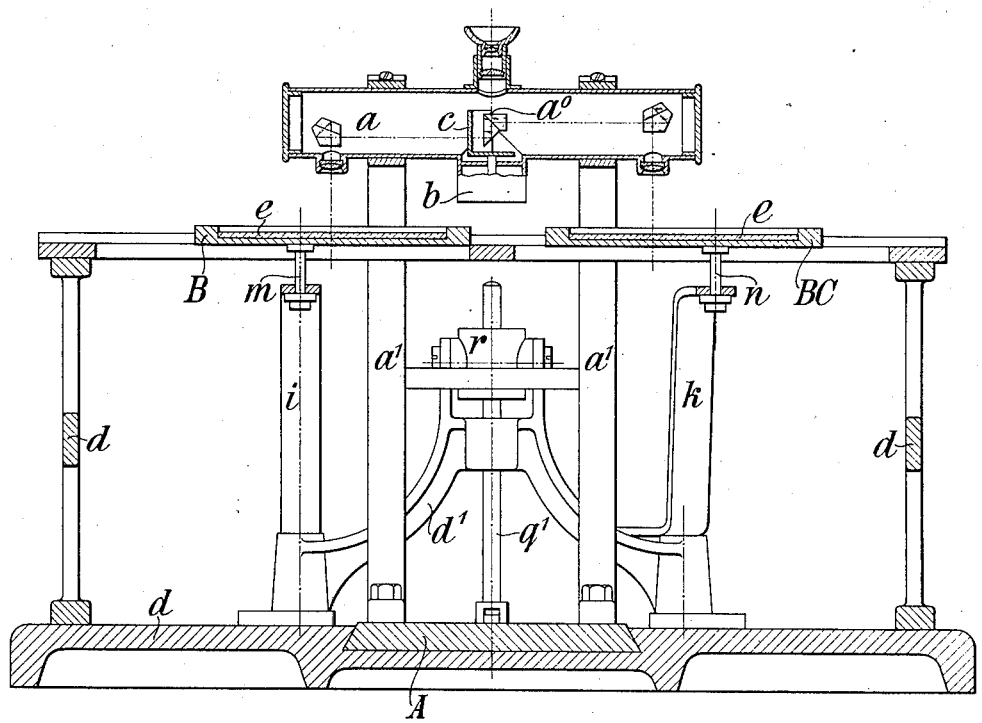

In the annexed drawings Figure 1 is a plan view of an apparatus constructed according to the invention. Fig. 2 is a vertical section on line 2—2 in Fig. 1. Fig. 3 is a vertical section on line 3—3 in Fig. 1. Fig. 4 is a vertical section on line 4—4 in Fig. 1.

The double microscope $a$ (Fig. 4) is constructed as a monocular one, and is therefore fitted with only a single mark $a^0$ in the image-field common to both objectives. Clockwork $b$ operates a blinking device consisting of a half cylinder $c$, which rotates about its axis (at the same time the ocular axis) and in this way alternately covers the system of rays coming from the left-hand and from the right-hand objective, so as to render the two images visible in moderately rapid succession. The microscope $a$ is fixed by means of two standards $a^1$ to a slide A, which is guided in the bed-plate $d$ of the whole arrangement. The direction of displacement of the slide A is at the same time the height-direction of the photograms $e$. The left-hand and the right-hand photogram are carried, in the example illustrated, by the slides B and C respectively, by means of which slides they may be displaced in their breadth direction. The connection between these two slides will be explained below.

The copying device comprises a cross-slide system consisting of three slides $A^1$, $B^1$ and $C^1$. Of these three slides the breadth-slide $B^1$ is disposed as the lowest one and is guided in a straight line on the bed-plate $d$. The depth-slide $C^1$ forms the middle, the height-slide $A^1$ the top member of the cross-slide system. The tool can be attached to the slide $A^1$, and is indicated in the drawing by the pointed style $f$, which is suitably set for copying lines of depth. The copy-carrier would then have to be set in a fixed position, as long as copying was being carried out from one and the same pair of photograms. It could e. g. be fixed to a table $d^0$. The slide $A^1$ is further fitted with two handles $g$, so as to be guided with both hands by the copyist, while he is observing in the ocular the coincidence of corresponding image-points with the mark. These two handles in the example shown represent the total system of actuating devices.

In the position of the whole arrangement, as shown in the drawing, the tool-point lies in the zero-height-plane $A^0$ (Fig. 2), in the zero-breadth-plane $B^0$ (Fig. 1) and at a distance $h$ from the zero-depth-plane $C^0$ (Fig. 1). For coupling the pair of slides B and C with the depth-slide $C^1$ and by this means indirectly with the breadth-slide $B^1$ two levers $i$ and $k$ are provided, the axes of rotation $i^0$ and $k^0$ of which have a fixed position relatively to the bed-plate $d$. The plane $i^0 k^0$ is parallel to the direction of displacement of the pair of slides B and C and at a fixed distance $l$ from the studs $m$ and $n$, which are fitted to this pair of slides and engage in slots $i^1$ and $k^1$ of the levers $i$ and $k$. The distance $l$ is equal to the focal length of the objectives used in producing the photograms $e$. By means of the slots $i^2$ and $k^2$ the levers $i$ and $k$ are guided on two other studs $o$ and $p$, which are fitted to the depth-slide $C^1$, in a plane parallel to the direction of displacement of the breadth-slide $B^1$. Should it be required to determine the position of the zero-depth-plane $C^0$, this plane will be found to lie for each position of the tool-point as far behind this point as the fixed plane $i^0 k^0$ lies behind the displaceable plane $o p$. This variable distance is marked $h$ in Figs. 1 and 2. The result of the disposition described above is, that to a displacement of the breadth-slide $B^1$, which is not accompanied by a displacement of the depth-slide $C^1$ in the depth-direction, there corresponds a joint displacement of the slides B and C without an alteration of the distance between the two. In order to produce such an alteration of distance of a suitable size, when $C^1$ is displaced in the depth-direction, the straight line $o p$ is shorter by a certain amount than the straight line $i^0 k^0$, viz. by the portion, which an imaginary line passing through $o$ parallel to $p k^0$ would cut off from the line $i^0 k^0$, which portion is equal to the product derived from the base-line employed, when the photograms were taken, and the scale of the copy.

The coupling of the slide A, which carries the microscope $a$, with the height-slide $A^1$ and thereby indirectly with the depth-slide $C^1$ may be seen from Fig. 2. The lever has here the form of a right-angled lever $q^1 q^2$. Its pivot lies in the plane $i^0 k^0$ (Fig. 1) in a universal joint $r s$, which is fitted to a standard $d^1$ at a point, which is higher by the focal length $l$ than the driver $t$ of the slide A. The lever $q^1$ is slidable in the inner part $s$ of the joint and is rotatable about the stud $t$. The other lever $q^2$ is rigidly connected with $s$ and is slidable in the inner part $u$ of a universal joint $u v$, which is fitted to the slide $A^1$ in the plane $o p$ (Fig. 1). Each of the three members of the cross-slide system is fitted with a clamping-screw $w$ (Fig. 1).

The operation of the device as shown in the drawing is as follows. Of a stereoscopic pair of photograms of the object to be plastically reproduced the left-hand one is laid on the slide B and the right-hand one on the slide B C. The operator then grasps the two handles $g g$ with both hands and, while observing the photograms in the microscope, displaces by means of said handles the cross-slide system (and thereby the slides carrying the photograms) until the coincidence of any corresponding image-points in the pair of photograms with the mark in the microscope is obtained. The resultant position of the point of the tool carried by the cross-slide system then gives the point on the surface of the plastic material, corresponding to the point of coincidence of the said image-points and mark, i. e. to the position in space of the corresponding object-point. This procedure is continued, without the operator having to remove his eye from the ocular, until the tool-point has traced out the complete surface of the plastic reproduction of the pair of photograms, i. e. has traced out a reproduction of the original object.

I claim:

The combination with a stereo-comparator of a triple cross-slide, the three slides of which are arranged one above the other, a pointed member carried by the topmost of the three slides, a coupling positively connecting the stereo-comparator and the triple slide and a system of devices adapted to actuate the slides and stereo-comparator and accessible to the operator while he is looking into the stereo-comparator.

EDUARD von OREL.

Witnesses:
PAUL KRÜGER,
FRITZ SANDER.

Copies of this patent may be obtained for five cents each, by addressing the "Commissioner of Patents, Washington, D. C."